United States Patent [19]
Sahlin

[11] Patent Number: 5,017,083
[45] Date of Patent: May 21, 1991

[54] APPARATUS FOR LOADING AND/OR UNLOADING INDUSTRIAL PRESSES

[75] Inventor: Richard T. Sahlin, Bloomfield Hills, Mich.

[73] Assignee: Sahlin International, Inc., Birmingham, Mich.

[21] Appl. No.: 400,334

[22] Filed: Aug. 30, 1989

Related U.S. Application Data

[63] Continuation-in-part of Ser. No. 918,346, Oct. 14, 1986, Pat. No. 4,921,395, which is a continuation of Ser. No. 368,914, Apr. 16, 1982, abandoned.

[51] Int. Cl.⁵ .............................................. B25J 13/04
[52] U.S. Cl. ................................ 414/744.3; 414/744.5; 1/15
[58] Field of Search ............... 414/744.3, 744.4, 744.5, 414/749–753; 901/15

[56] References Cited

U.S. PATENT DOCUMENTS

| | | |
|---|---|---|
| 2,572,874 | 10/1951 | MacKnight . |
| 3,010,587 | 11/1961 | Hollinger . |
| 4,056,198 | 11/1977 | Boserup . |
| 4,226,568 | 10/1980 | Christian . |
| 4,299,533 | 11/1981 | Ohnaka . |
| 4,370,091 | 1/1983 | Gagliardi . |
| 4,392,776 | 7/1983 | Shum . |
| 4,507,046 | 3/1985 | Sugimoto et al. . |

FOREIGN PATENT DOCUMENTS

| | | |
|---|---|---|
| 922331 | 3/1973 | Canada . |
| 2802738 | 1/1978 | Fed. Rep. of Germany . |
| 2346071 | 3/1977 | France . |
| 440270 | 11/1978 | France . |

Primary Examiner—David A. Bucci
Assistant Examiner—Donald W. Underwood
Attorney, Agent, or Firm—Harness, Dickey & Pierce

[57] ABSTRACT

Work-handling apparatus, such as may be used in automatically loading and unloading a press in the manufacture of large sheet metal components, is arranged to reciprocate a work-handling attachment substantially linearly. The attachment is pivotally mounted on a crank lever, which is pivotally mounted on a crank arm, which is pivotally mounted on mounting means, the pivot axes of the crank arm, which is pivotally mounted on mounting means, the pivot axes of the crank arm and the attachment being substantially equi-distant from that of the crank lever. By means of geared connection between the mounting means and the crank lever (in the ratio of substantially 2:1), and between the crank arm and the attachment (in the ratio of substantially 1:2) the attachment is caused to maintain a substantially constant angular orientation during linear movement resulting from the coordinated rotations of the crank lever and the crank arm.

19 Claims, 6 Drawing Sheets

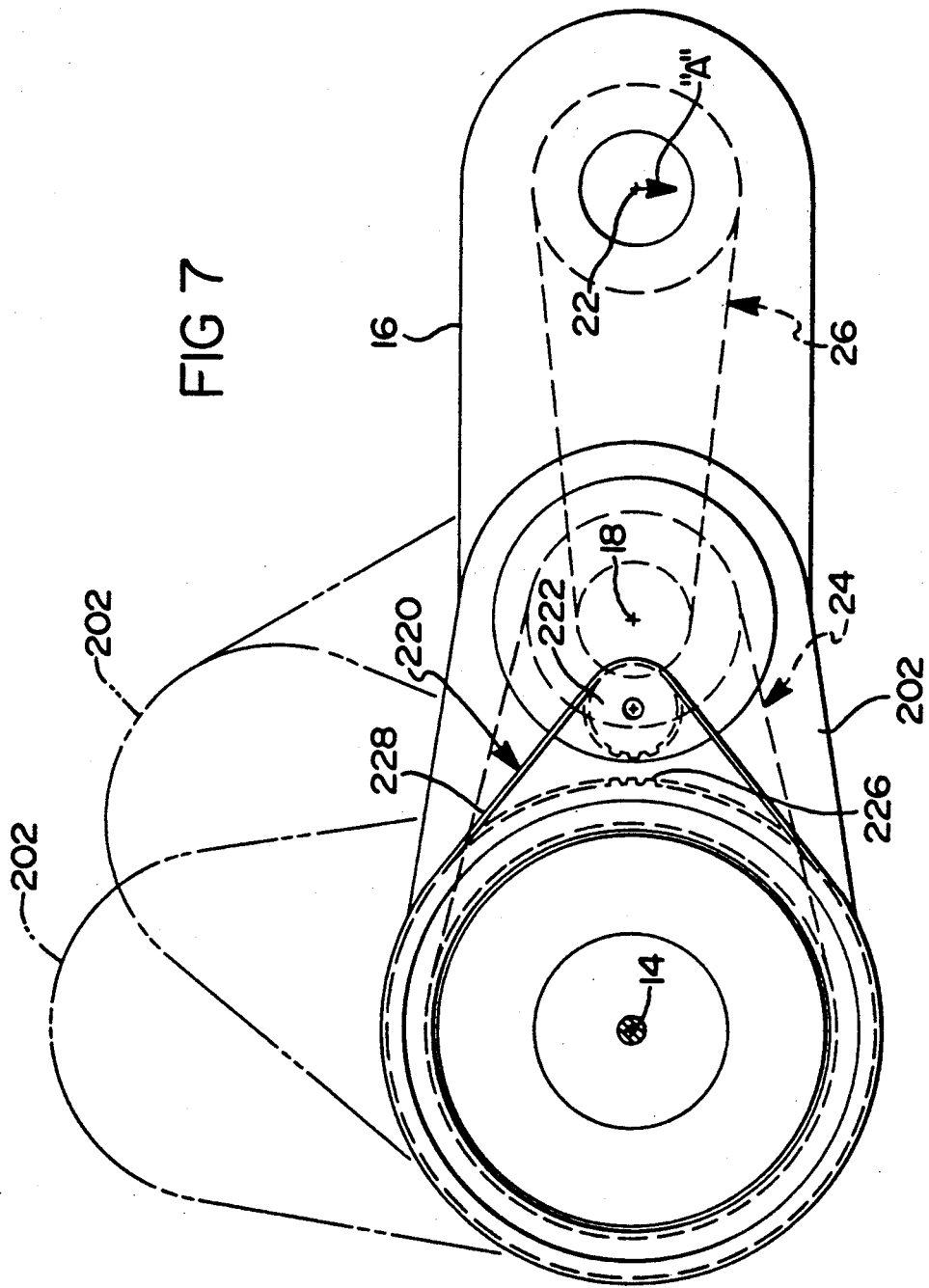

APPARATUS FOR LOADING AND/OR UNLOADING INDUSTRIAL PRESSES

RELATED APPLICATION

This application is a continuation-in-part of Ser. No. 918,346, filed Oct. 14, 1986, U.S. Pat. No. 4,921,395, which is a continuation of Ser. No. 368,914, filed Apr. 16, 1982, abandoned.

BACKGROUND

This invention is concerned with improvements in or relating to work pick-up and/or handling apparatus such as may be used in automatically picking up, moving, and releasing workpieces with respect to different positions or stations in a repetitive manufacturing process. For example, such an apparatus may be used in loading and/or unloading a press in the manufacture of sheet metal pressings or stampings. In particular, the invention relates to such apparatus which is arranged to impart to work-supporting means of the apparatus, and so to a workpiece when held, a reciprocable linear movement.

One such apparatus is described in U.K. Patent specification No. 1,395,058. That known apparatus comprises a linearly-reciprocable wheeled carriage for supporting any one of a variety of work-handling attachments. The carriage is constrained by guide rails to remain in a constant orientation as it is reciprocated to and fro along a linear path. The carriage is pivotally connected to a crank lever which, in turn, is pivotally connected to a crank arm, the three pivot axes being in parallel and the effective lengths of the crank arm and crank lever, measured between the pivot axes, being equal. By means of a geared connection in the ratio of 2:1 from a stationary gear on the pivot axis of the crank arm to a gear which is fast with the crank lever on the pivot axis of the crank lever, it is provided that linear motion is imparted to the carriage upon rotation of the crank arm about its pivot axis, the linear path of the carriage being intersected by the pivot axis of the crank arm.

BRIEF SUMMARY

It is an object of the present invention to provide work handling apparatus for industrial presses which comprises work-supporting means that is arranged to be linearly reciprocated without the need for guide rails in order to determine its path of movement and which, preferably, also maintains the orientation of the work-supporting means constant.

A preferred form of the invention provides in one of its aspects, work handling apparatus comprising mounting means, a first arm pivotally mounted on the mounting means for movement about a first pivot axis, a second arm pivotally mounted on the first arm for movement about a second pivot axis parallel to the first pivot axis, and work-supporting means pivotally mounted on the second arm for movement about a third pivot axis parallel to the first and second pivot axes, the first and third pivot axes preferably being substantially equi-distant from the second pivot axis and the apparatus comprising first coordinating means arranged to so coordinate movements of the arms about the first and second pivot axes such that the work-supporting means moves substantially linearly, and with preferably a second coordinating means comprising a geared connection of a desired ratio between the first arm and the work-supporting means whereby a desired orientation of the work-supporting means is obtained, such as no angular change despite linear movement.

Preferably, the first arm is pivotally mounted on a linearly-reciprocable carriage of the mounting means, the carriage being reciprocable relative to a carrier of the mounting means in a direction perpendicular to the direction in which the work-supporting means is arranged to move. The work-supporting means is preferably arranged to move generally horizontally (upon movement of the two arms) and the carriage arranged to move generally vertically on the carrier. The carriage and the carrier may be telescopically arranged, and in a preferred construction, the carriage is suspended from the carrier by means comprising a plurality of pneumatic balancer cylinders and guided in its movements by rollers mounted on one of the carriage and the carrier and arranged to roll against the other.

The work-supporting means may be arranged to carry any one of a variety of work-holding attachments for picking-up, moving and releasing workpieces, such as vacuum cups, jaws, gripping fingers, magnets, etc. An electrical and/or fluid control system (not shown) may be employed to synchronize operation of the apparatus and a work-holding attachment with operation of a press, for example, which the apparatus is to load and/or unload automatically. The mounting means of the work handling apparatus may be secured in any of various positions, such as directly on a press frame, on a powered transfer carriage across a press, or on a transfer system or conveyor. The absence of guide rails for the work-supporting means provides more floor clearance around the press and thereby encourages efficient operation at high speed.

There now follows a detailed description, to be read with reference to the accompanying drawings, of the presently preferred embodiments which illustrate the invention by way of example.

DESCRIPTION OF THE DRAWINGS

FIG. 7 is a sectional view, taken along line VII—VII of FIG. 4.

DETAILED DESCRIPTION OF THE INVENTION

Figure 1:
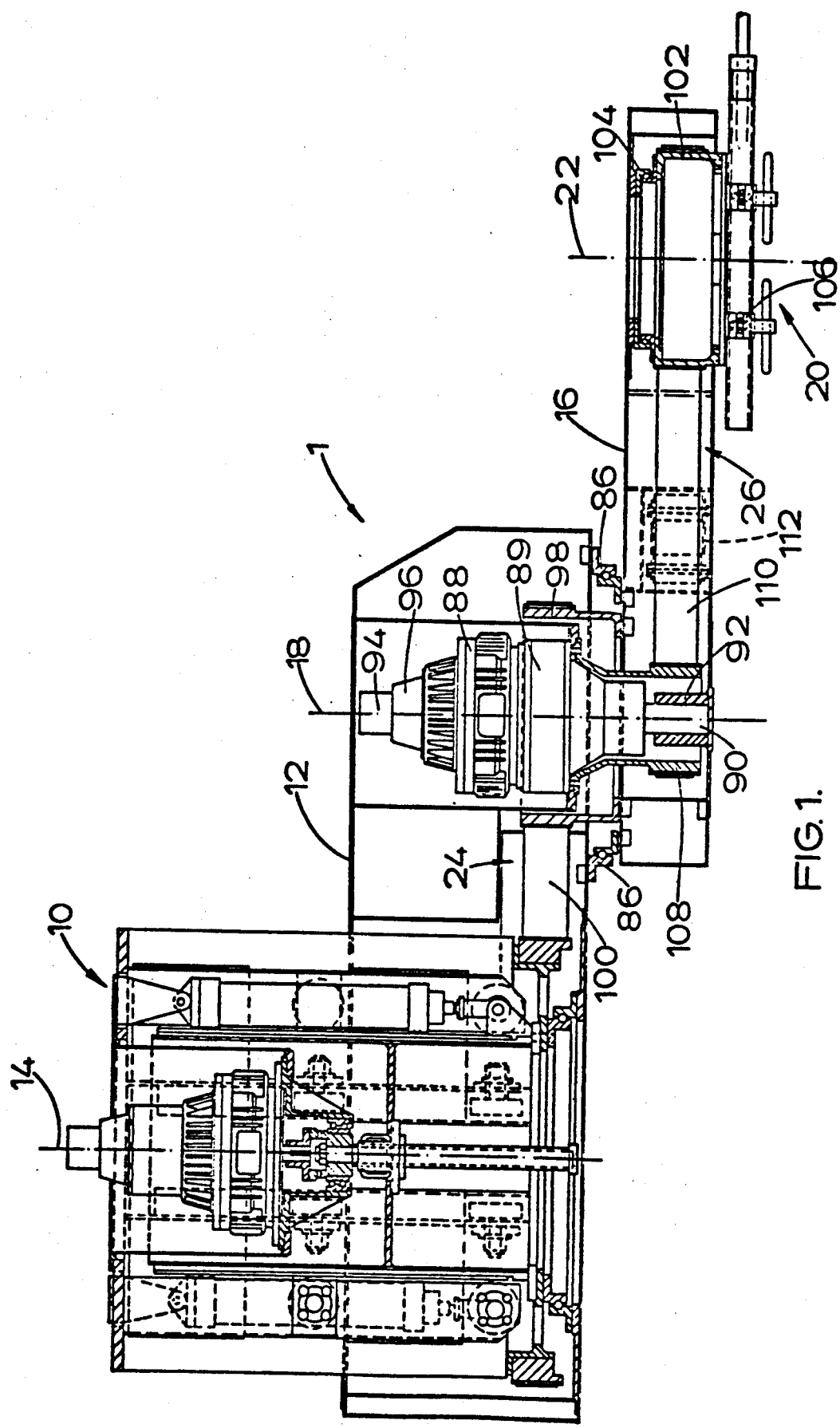
FIG. 1 is a sectional view of the apparatus, according to a first preferred embodiment, taken in section along a vertical mid-plane with the apparatus in an extended position.

Referring to FIG. 1, Apparatus 1 is illustrated in a first preferred form of the invention and comprises mounting means 10 which could be secured, for example, to the frame of a large industrial press used to fabricate shapes in large steel workpieces, such as roofs of automobiles. A first arm 12 (hereinafter referred to as the crank or upper arm) is pivotally mounted on mounting means 10 for movement about a first vertical pivot axis 14. A second arm 16 (hereinafter referred to as the crank lever or lower arm) is pivotally mounted on the crank arm 12 for movement about a second vertical pivot axis 18. Work-supporting means 20 is pivotally mounted on the crank lever 16 for movement about a third vertical pivot axis 22. The first and third pivot axes 14 and 22 are equi-distant from the second pivot axis 18. The apparatus 1 also comprises first coordinating means, including a first geared connection 24, arranged to so coordinate movements of the crank arm 12 and the crank lever 16 about the first and second pivot axes 14 and 18 that the work-supporting means 20 moves linearly along a horizontal path. The apparatus 1 also comprises second coordinating means, including a second geared connection 26, whereby the orientation of the work-supporting means 20 is maintained constant throughout swinging movements of the crank arm 12 and crank lever 16.

The mounting means 10 (see FIGS. 2 and 3) comprises a linearly-reciprocable carriage 28 on which the crank arm 12 is pivotally mounted, the carriage 28 being vertically reciprocable relative to a carrier 30 of the mounting means 10. The carriage 28 and carrier 30 are telescopically arranged, with the carriage 28 mounted within the carrier 30. The carriage comprises a straight, vertically aligned, tubular frame 32 of a generally octagonal cross-section, bearing an internal cross-plate 34. Secured to the bottom end of the tubular frame 32, and aligned coaxially therewith, are a first pulley 36 and an inner race of a first slewing or turntable bearing 38 of the machine.

The carrier 30 also comprises a generally octagonal tubular frame 40, coaxially arranged around the carriage 30 and depending from an annular, horizontal, top plate 42. A cylindrical skirt 44 depends from the outer periphery of the top plate 42 to shield the frame 40 of the carrier 30.

Figure 3:
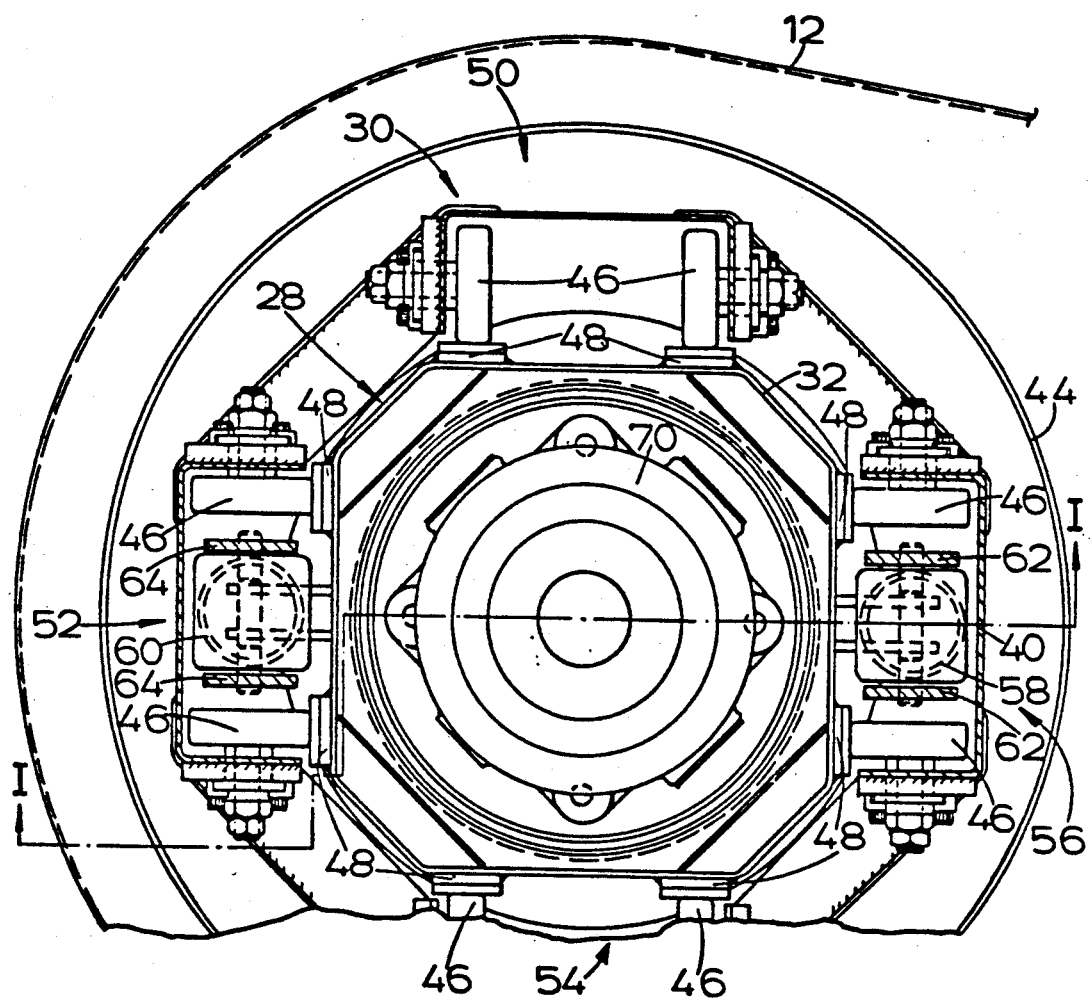
FIG. 3 is a partial plan view in section on the line III—III of FIG. 2.
Figure 4:
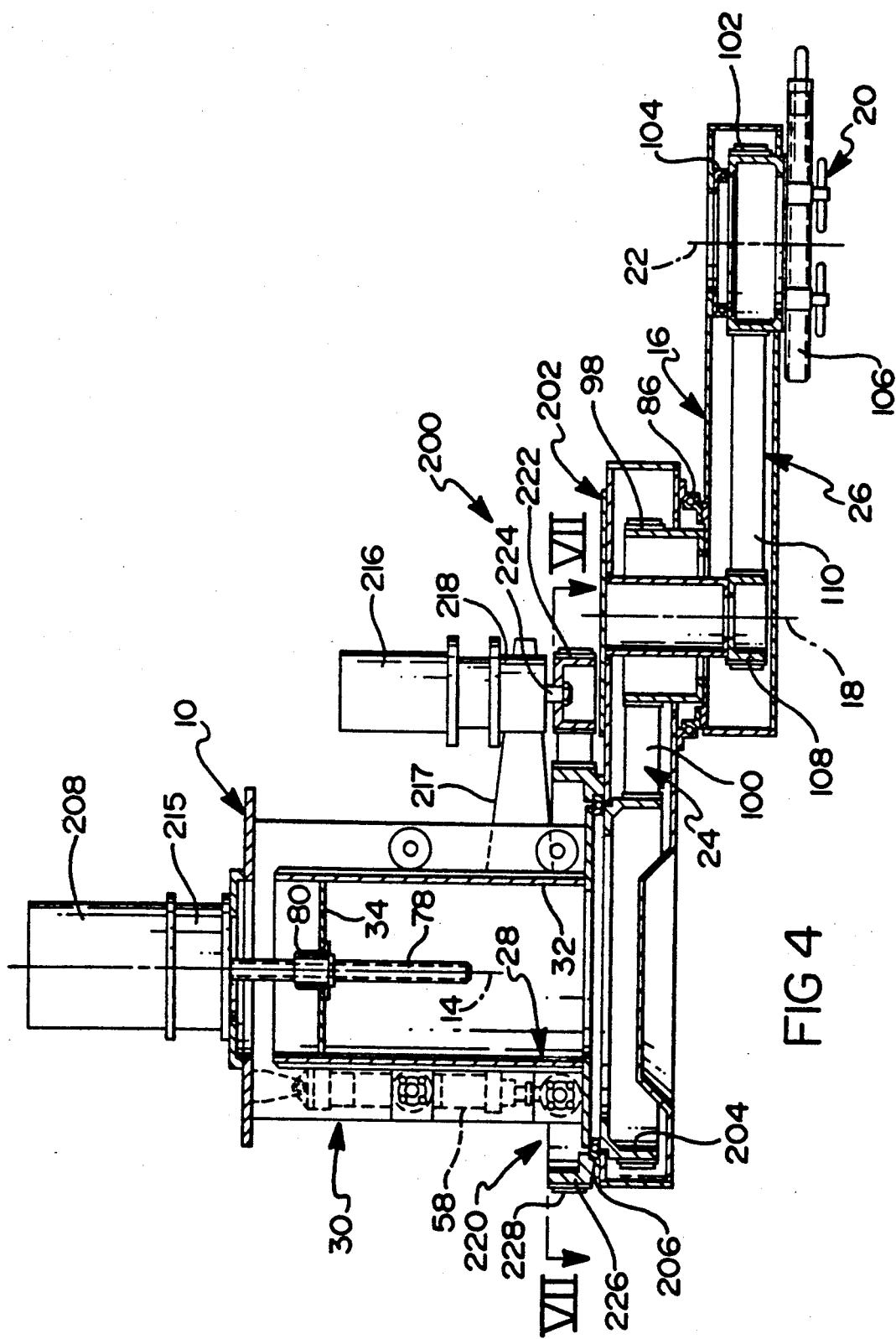
FIG. 4 is a sectional view of the apparatus, in accordance with a second preferred embodiment, taken in section along a vertical mid-plane with the apparatus in a fully extended position.
Figure 5:
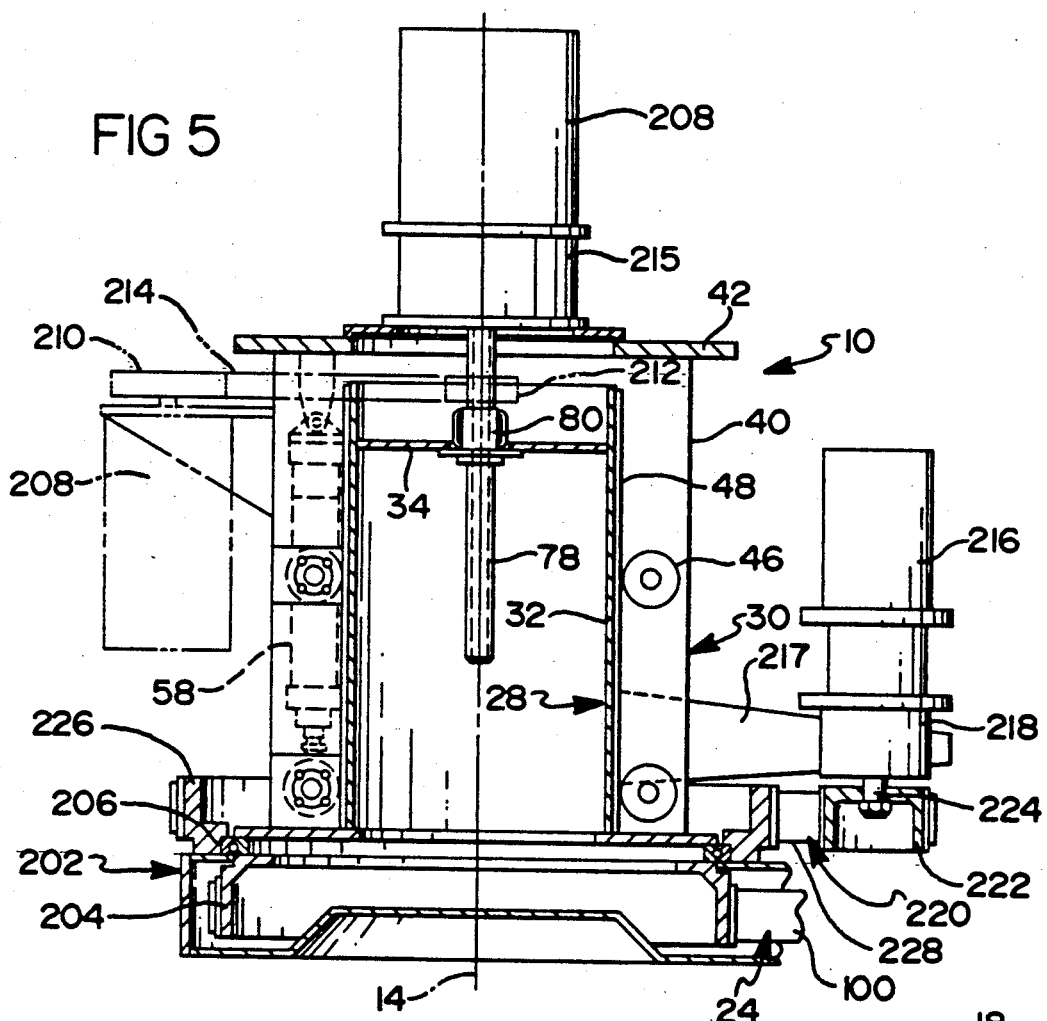
FIG. 5 is a partial sectional view, similar to FIG. 4, which illustrates the vertical movement structure and motor mountings to a larger scale.

The carriage 28 is guided for vertical movements within the carrier 30 by means of sixteen rollers 46 mounted on the carrier frame 40 and arranged to roll against linear tracks 48 secured to outer surfaces of the carriage frame 32. There are four sets 50, 52, 54, 56 of four rollers, each set extending longitudinally of the carriage 28 with the sets being arranged in two pairs of opposed sets, the line of action of one pair of sets 50 and 54 being perpendicular to the line of action of the other pair of sets 52 and 56. Each set comprises an upper and a lower pair of rollers, the two pairs being spaced apart longitudinally of the carriage 28 and the rollers in each pair of rollers being spaced apart transversely of the carriage. As shown in FIG. 3, the rollers 46 of each pair of rollers are pivotally mounted on the side walls of a radially-inwardly facing channel-shaped portion of the carrier frame 40, the two rollers being positioned between the side walls.

The carriage 28 is suspended from the carrier 30 by means of at least one and preferably two pneumatic balancer cylinders 58 and 60 which act between the carrier 30 and the carriage 28 to take the weight of the carriage and its load. Supplies of air under pressure to the cylinders are regulated by suitable means to maintain the pressure within the cylinders constant as the carriage moves. The cylinders extend vertically, on opposite sides of the carriage axis, between top brackets 62 and 64 secured to the top plate 42 of the carrier and bottom brackets 66 and 68 secured to the carriage frame 32 adjacent its bottom end. The cylinders 58 and 60 are arranged equi-distant from, and on opposite sides of, the carriage/carrier axis, which it will be understood is also the first pivot axis 14, each cylinder extending from the top plate 42 down between the upper rollers and between the lower rollers of the two pairs of rollers of a roller set.

The apparatus 1 includes a nut-and-screw arrangement which determines the vertical position of the carriage 28 relative to the carrier 30, one of the nut and the screw being non-rotatably secured to one of the carriage and the carrier and the other of the nut and the screw being arranged to be rotated by vertical movement actuating means comprising a motor 70 mounted on the other side of the carriage and the carrier. The motor 70 is shown affixed within the carrier 30, being mounted in a well 72 of the carrier, and comprises an output shaft 74 arranged for rotation about the first pivot axis 14. By means of a coupling 76, a screw 78 is secured to the shaft 74, the screw being in threaded engagement with a recirculating ball nut 80 mounted on the cross-plate 34 of the carriage. An encoder and tachometer unit 82 and a clutch and brake unit 84 are associated with the motor 70.

Figure 2:
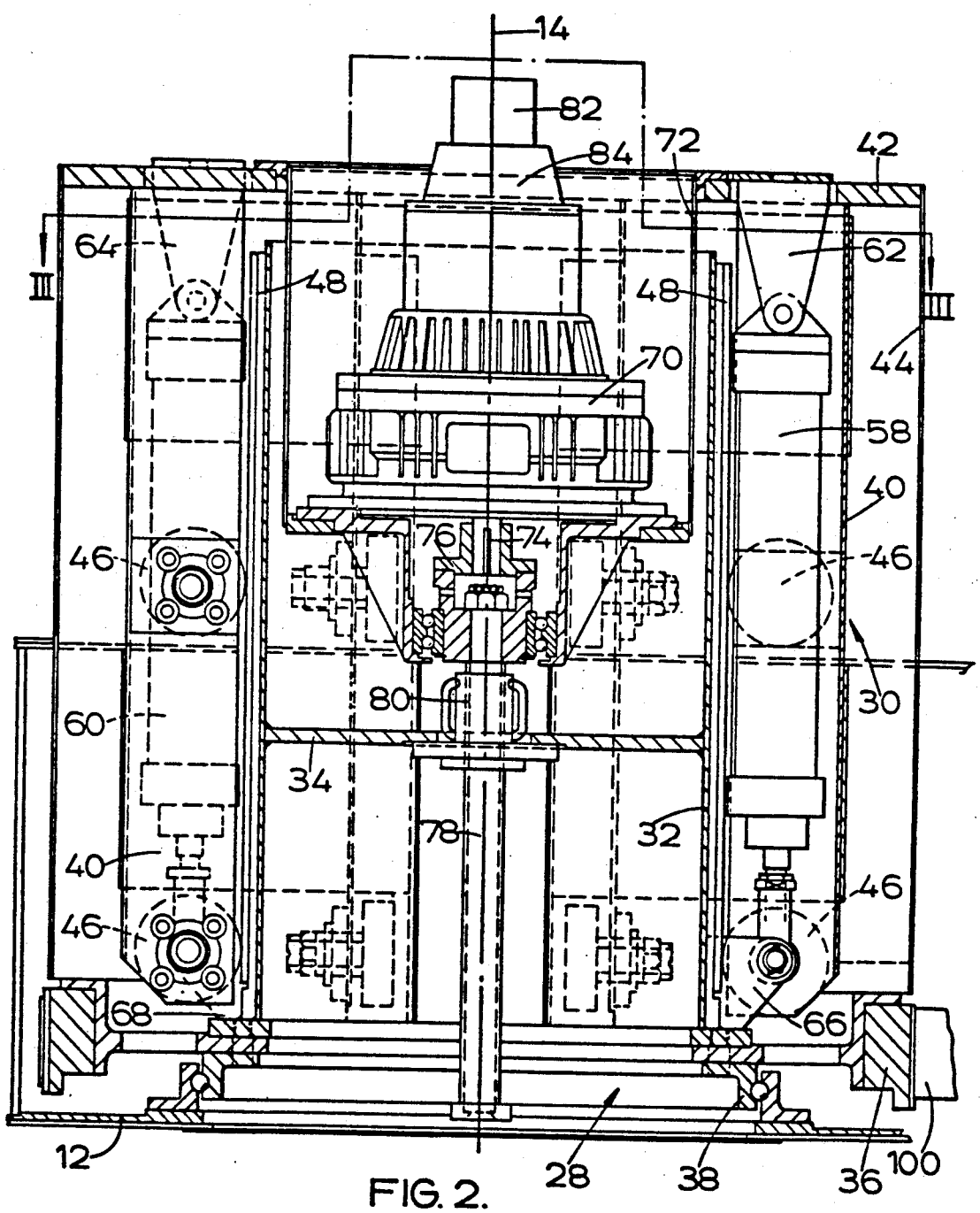
FIG. 2 is a partial view, similar to FIG. 1, which shows the mounting means of the apparatus to a larger scale.

The crank arm 12 is affixed (as by bolts, not shown) to the outer race of the first turntable bearing 38 beneath the carriage frame 32 (FIG. 2). The crank arm 12 is of a hollow, tubular, fabricated, sheet metal construction. Adjacent an outer distal end of the crank arm 12, the crank lever 16 is pivotally mounted for rotation beneath the crank arm 12 about the second pivot axis 18. The crank lever 16 is mounted on crank arm 12 by means of a second slewing or turntable bearing 86 of the apparatus. An outer race of the bearing 86 is affixed (as by bolts, not shown) to the crank arm 12 and the inner race is affixed to the crank lever 16.

Actuating means for horizontal movement is coupled to the crank lever 16 to rotate it about the second pivot axis 18 on the second turntable bearing 86 and comprises a second motor 88 of the apparatus. The motor 88 is mounted on the crank arm 12 (housed within the arm) in association with a gear reducer 89 secured to the arm 12. Motor 88 has a vertical output shaft 90 arranged for rotation about the second pivot axis 18. The crank lever 16 is of a hollow, tubular, fabricated sheet steel construction. The gear reducer 89 and the output shaft 90 project from the crank arm 12 into the interior of the crank lever 16. The shaft 90 is secured to the crank lever 16 by means of a sleeve 92 affixed as by welding to a bottom inside face of the crank lever 16. An encoder and tachometer unit 94 and a brake unit 96 are associated with the motor 88 to provide for accurate control of angular positions of the two arms and therefore of the linear position of the work-supporting means 20.

The first coordinating means, comprising the first geared connection 24, includes in addition to the pulley 36 of the carriage 28, a second pulley 98. The second pulley 98, coaxial with axis 18, is secured fast as part of the crank lever 16, and projects upwardly into space within the crank arm 12. The geared connection 24 comprises a toothed timing-belt 100 which extends around the two toothed pulleys 36 and 98 and through the crank arm 12 therebetween. The pulleys are sized to provide a geared connection in the ratio of 2:1 from the carriage 28 to the crank lever 16.

Adjacent an outer distal end of the crank lever 16, the work-supporting means 20 is pivotally mounted on the crank lever 16 for rotation about the third pivot axis 22. The work-supporting means comprises a third pulley 102 of the apparatus, affixed as by bolts (not shown) to an inner race of a third slewing or turntable bearing 104. An outer race of the bearing 104 is secured fast to a top inside face of the hollow crank lever 16, so that the pulley 102 is housed substantially wholly within the crank lever. Adjustable attachment-holding means 106 for connection to a suitable specific workpiece pick-up device (not shown) is secured fast with the pulley 102 to depend beneath the crank lever 16.

The second coordinating means, comprising the second geared connection 26, includes in addition to the pulley 102 of the work-supporting means 20, a fourth pulley 108 of the apparatus 1. The fourth pulley 108 is secured fast as part of the crank arm 12, being secured generally beneath the motor 88, coaxially with the second pivot axis 18, and projecting downwardly into the interior of the crank lever 16. The second geared connection comprises a toothed timing-belt 110 which extends around the two toothed pulley 108 and 102 and through the crank lever 16 therebetween. The pulleys 108 and 102 and the timing-belt 110 provide a geared connection in the ratio of 1:2 from the crank arm 12 to the work-supporting means 20.

Preferably, idlers 112 for each reach of each timing-belt 110 and 100 are used to apply balanced pressure to opposite sides of the respective belts and take-up slack in each.

In operation of the apparatus 1, power for horizontal movement is supplied by motor 88. The motor 88, by way of gear reducer 89, is secured to crank arm 12 to move with it. The rotary output shaft of the motor 88 is secured to crank lever 16 via sleeve 92 to move with it. Thus, when the motor 88 is energized, the crank arm 12 and crank lever 16 move angularly relative to each other about axis 18. The amount of such relative movement equals the degree of rotation of the output shaft 90. If the shaft rotates 90°, for example, the included angle between the two arms changes by 90°.

When the motor 88 is energized, there is also pivotal movement of the crank arm 12 about the axis 14. This occurs because pulley 98 is rotated about axis 18 upon rotation of crank lever 16. The amount of the movement of crank arm 12 is determined by the 1:2 ratio of diameters of pulley 98 to pulley 36. Pulley 36 is stationary so motion of belt 100 by pulley 98 cannot move it. Instead, the entire crank arm 12 will pivot about axis 14 and the degree of angular movement will be one half the degree of rotation of shaft 90. If the shaft 90 rotates 90°, for example, the crank arm 12 will pivot 45° about axis 14.

Considering the apparatus 1 oriented as shown in FIG. 1, all three pivot axes 14, 18, and 22 lie in the same vertical plane. If shaft 90 is rotated, axis 18 will be moved out of this vertical plane. Axis 14 is fixed in the vertical plane and does not move. Axis 22 stays in the vertical plane but moves to the left, i.e., it is retracted from its fully extended stroke position of FIG. 1. Axis 22 stays in the same vertical plane because (a) axis 18 is always midway between axes 14 and 22 since the distance 14–18 equals the distance 18–22 and (b) the 1:2 ratio of pulleys 98 and 36 insures that the angle of displacement of axis 18 out of the vertical plane (i.e., the angle made by crank arm 12 between its position in FIG. 1 and its displaced position) is one half that of the included angle between crank arm 12 and crank lever 16. If distance 14–18 is unequal to distance 18–22 (especially if the inequality is small), the difference in distance can be counteracted by corresponding change in the ratio of the diameters of pulleys 98 and 36 in order to maintain movement of axis 22 in the same vertical plane, i.e., straight line, horizontal motion.

In conjunction with horizontal motion, or separately, vertical movement of the work-holding attachment 106 can be achieved by appropriately energizing motor 70. While this motor has been illustrated in alignment with axis 14, it and the vertical movement actuating and support mechanism could be located elsewhere; for example, at axis 18. Similarly, while the rotary horizontal drive motor is shown on axis 18, it could also be located elsewhere, on axis 14 for example, since the two coordinating systems 24 and 26 will maintain the desired relationship among the various parts.

Referring now to FIGS. 4 through 7, a second embodiment of the apparatus 200 is disclosed. Unless otherwise noted herein, like components maintain like reference numerals throughout the drawings. In general, apparatus 200 differs from the first embodiment disclosed in that the motor used for generating horizontal movement of the two arms is non-pivotally affixed to carriage 28 instead of being secured directly to one of the arms. This configuration substantially reduces the mass suspended from the arms so as to permit utilization of smaller bearings for cost effectiveness.

Apparatus 200 comprises mounting means 10 which could be secured, for example, to the frame of a large industrial press used to fabricate shapes in large steel workpieces, such as roofs of automobiles. First crank arm 202 is pivotally mounted on mounting means 10 for movement about the first vertical pivot axis 14. Further, crank lever 16 is pivotally mounted on crank arm 202 for movement about the second vertical pivot axis 18. Work-supporting means 20 is pivotally mounted on crank lever 16 for movement about the third vertical pivot axis 22. First and third pivot axes 14 and 22 are preferably equi-distant from second pivot axis 18. Similarly, apparatus 200 also comprises first coordinating means, including a first geared connection 24, arranged to so coordinate movements of crank arm 202 and crank lever 16 about first and second pivot axes 14 and 18, respectively, such that work-supporting means 20 moves substantially linearly along a horizontal path. Likewise, apparatus 200 comprises second coordinating means, including a second geared connection 26, whereby the orientation of work-supporting means 20 is maintained constant throughout pivotal swinging movements of crank arm 202 and crank lever 16. FIGS. 6A through 6E illustrate the orientation of work-supporting means 20, the angular orientation of which is indicated by arrow "A", throughout the pivotal range of motion of the arms.

Mounting means 10 comprises a linearly reciprocable carriage 28 on which crank arm 202 is pivotally mounted, with carriage 28 being vertically reciprocable relative to carrier 30. Carriage 28 and carrier 30 are telescopically arranged, with carriage 28 mounted within carrier 30. As previously described, carriage 28 comprises a straight, vertically aligned, tubular frame 32 bearing an internal cross-plate 34. Secured to the bottom end of the tubular frame 32, and aligned coaxially therewith, are a first pulley 204 and an inner race of a first slewing or turnable bearing 206.

Carrier 30 also comprises a tubular frame 40, coaxially arranged around carriage 28 and depending from annular, horizontal, top plate 42. A cylindrical skirt (not shown) depends from the outer periphery of top plate 42 to shield frame 40 of the carrier 30.

Carriage 28 is guided for vertical movements within carrier 30 by means of a plurality of rollers preferably consisting of sixteen rollers 46 mounted on carrier frame 40 and arranged to roll against linear tracks 48 secured to outer surfaces of carriage frame 32. This structure and its operation having been detailed with reference to the first preferred embodiment.

Carriage 28 is suspended from carrier 30 by means of at least one pneumatic counter-balance cylinder 58 which acts between carrier 30 and carriage 28 to support the weight of carriage 28, arms 202 and 16 as well as the weight of any workpiece supported by work-supporting means 20. A regulated pressurized fluid source maintains the fluid pressure within the counter-balance cylinder constant as carriage 28 vertically reciprocates. The operation, orientation and structural interconnection of the counter-balance cylinder with carriage 28 and carrier 30 is similar to that previously disclosed.

Apparatus 200 includes a nut-and-screw arrangement which determines the vertical position of carriage 28 relative to carrier 30, one of the nut and the screw being non-rotatably secured to one of the carriage and the carrier and the other of the nut and the screw being rotated by vertical movement actuating means comprising a motor 208 securely mounted to mounting means 10 above top plate 42. Motor 208 has an output shaft (not shown) arranged for rotation about first pivot axis 14. By means of a coupling (not shown), a screw 78 is secured to the output shaft, the screw 78 being in threaded engagement with a recirculating ball nut 80 mounted on cross-plate 34 of carriage 28. The coupling and the output shaft are located within casing 215. An encoder and tachometer unit and a brake unit (not shown) are preferably associated with motor 208. The phantom lines illustrated in FIG. 5 disclose an alternative mounting for motor 208. Such an offset mounting arrangement, including pulleys 210 and 212 and offset drive means comprising timing-belt 214, is contemplated when overhead mounting space above top plate 42 is limited.

Crank arm 202 is affixed (as by bolts, not shown) to the outer race of first turntable bearing 206 beneath carriage frame 32. Crank arm 202 is of a hollow, tubular, construction, preferably being fabricated as an aluminum casting. Adjacent an outer distal end of crank arm 202, crank lever 16 is pivotally mounted for rotation beneath crank arm 202 about second pivot axis 18. Crank lever 16 is mounted on crank arm 202 by means of a second slewing or turntable bearing 86 of the apparatus 200. Crank lever 16 is preferably of a hollow, tubular, cast aluminum construction. An outer race of bearing 86 is affixed as by bolts (not shown) to crank arm 202 with the inner race being affixed to crank lever 16.

The first coordinating means, comprising first geared connection 24, includes in addition to first pulley 204 of carriage 28 a second pulley 98. Second pulley 98, coaxial with axis 18, is secured fast as part of crank lever 16, and projects upwardly into space within crank arm 202. Geared connection 24 comprises a toothed timing-belt 100 which extends around the two toothed pulleys 204 and 98 and through crank arm 202 therebetween. The pulleys are sized to provide a geared connection in the ratio of 2:1 from carriage 28 to crank lever 16.

Adjacent an outer distal end of crank lever 16, work-supporting means 20 are pivotally mounted on crank lever 16 for rotation about third pivot axis 22. The work-supporting means comprises a third pulley 102, affixed as by bolts (not shown) to an inner race of a third slewing or turntable bearing 104. An outer race of bearing 104 is secured fast to a top inside face of hollow crank lever 16, so that third pulley 102 is housed substantially wholly within crank lever 16. Adjustable attachment-holding means 106 for connection to a suitable specific workpiece pick-up device (not shown) are secured fast with pulley 102 to depend beneath crank lever 16.

The second coordinating means, comprising second geared connection 26, includes in addition to the third pulley 102 of work-supporting means 20, a fourth pulley 108. Fourth pulley 108 is secured fast as part of crank arm 202, projecting downwardly into the interior of crank lever 16. Second geared connection 26 comprises a toothed timing-belt 110 which extends around third and fourth toothed pulleys 102 and 108, respectively, and through crank lever 16 therebetween. Pulleys 108 and 102 and timing-belt 110 provide a geared connection in the ratio of 1:2 from crank arm 202 to work-supporting means 20.

Again, it is contemplated that idlers (not shown) for each reach of each timing-belt 110 and 100 be used to apply balanced pressure to opposite sides of the respective belts, to permit selective alignment of the arms, and/or take-up slack.

Arm actuating means for generating horizontal pivotal movement is drivingly coupled to crank arm 202 to rotate it about first pivot axis 14 on first turntable bearing 206 and comprises a second motor 216 of the apparatus. Motor 216 is non-rotatably affixed to carriage 28 via brackets 217 to move vertically therewith. Motor 216 has a vertical output shaft (not shown) coupled to gear reducer 218 for providing a desired rotational shaft speed and for driving a third geared connection 220. Third geared connection 220 includes a fifth pulley 222 coupled to rotate with shaft 224 extending from gear reducer 218 so as to be driven by motor 216. A sixth pulley 226, coaxial with carrier 30 along first pivot axis 14, is secured fast to a top surface of crank arm 202. Fifth pulley 222 drives timing-belt 228 so as to pivot crank arm 202 around first pivot axis 14. Since sixth pulley 226 is fixed to crank arm 202, the entire crank arm 202 will pivot about first axis 14. An encoder and tachometer unit (not shown) is associated with second motor 216 to provide for accurate control of angular positions of the two arms and, therefore, of the linear position of the work-supporting means 20. Fifth and sixth pulleys, 222 and 226, respectively, are sized to provide a third geared connection 220 having a preferable ratio of 1:4 to permit a significant reduction in the torque requirements of reducer 218 in comparison to that associated with the first embodiment.

In operation, apparatus 200 is powered for horizontal movement by second motor 216. Motor 216, by way of gear reducer 218, is secured to carriage 28 to move vertically with carriage 28. Thus, when motor 216 is energized, crank arm 202 and crank lever 16 move angularly relative to each other about axis 18. The amount of such relative movement is equal to twice the degree of rotation of crank arm 202. If crank arm 202 rotates 90°, for example, the included angle between the two arms changes by 180°. This relationship is illustrated in FIGS. 6A through 6E.

Likewise, when second motor 216 is energized, there is pivotal horizontal movement of crank lever 16 about second pivot axis 18. This occurs because pulley 98 is rotated about axis 18 upon rotation of crank arm 202. The amount of movement of crank lever 16 is determined by the 1:2 ratio of diameters of second pulley 98 to first pulley 204. First pulley 204 is stationary such that motion of belt 100 rotates second pulley 98 about axis 18. Therefore, when crank arm 202 is driven about first pivot axis 14 via motor 216, its degree of angular movement will be one half the degree of rotation (the included angle) between crank arm 202 and crank lever 16.

Figure 6A:
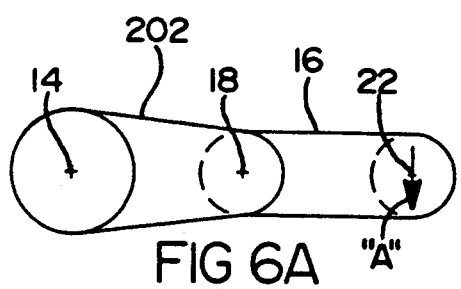
FIG. 6A thru 6E are diagrammatical schematics depicting the angular interaction and orientation of the various components.
Figure 6B:
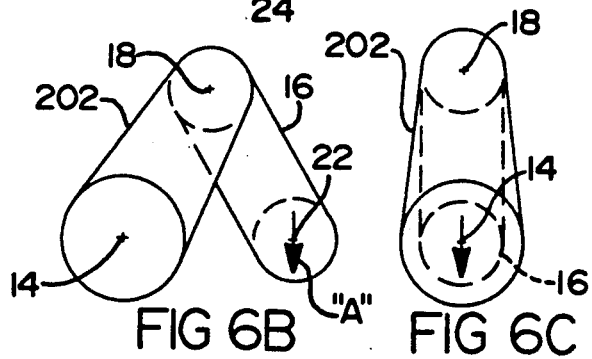
Figure 6C:
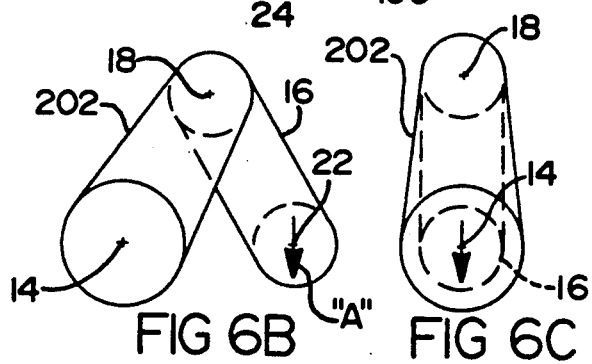
Figure 6D:
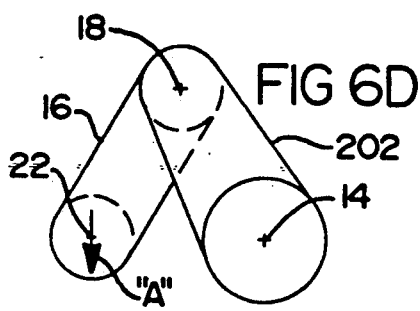
Figure 6E:
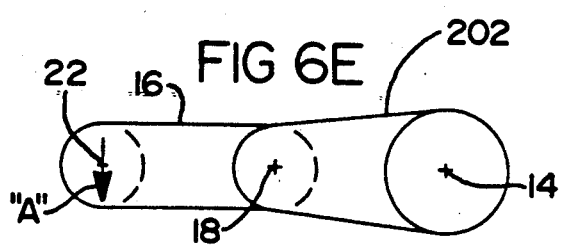

Considering the apparatus 100 in the condition of FIG. 6A through 6E and FIG. 7, all three axes 14, 18, and 22 lie in the same vertical mid-plane. When fifth pulley 222 is drivingly rotated, second pivot axis 18 will be moved out of this vertical mid-plane. First pivot axis 14 is fixed in the vertical mid-plane and does not move. As shown in succession in FIGS. 6A through 6E, third pivot axis 22 stays in the vertical mid-plane but moves to the left from its fully extended stroke position (FIG. 6A) to an opposite fully extended stroke position (FIG. 6E). Third pivot axis 22 stays in the same vertical mid-plane because (a) axis 18 is maintained midway between axes 14 and 22 since the distance 14-18 equals the distance 18-22 and (b) the 1:2 diametric ratio of pulleys 98 and 204 insures that the angle of displacement of second pivot axis 18 out of the vertical mid-plane (i.e., the angle made by crank arm 202 between its position in FIG. 6A and its displaced position shown in FIG. 6C) is one half that of the included angle between crank arm 202 and crank lever 16.

However, it is contemplated that a predetermined curvilinear path of third pivot axis 22 (and, therefore, the workpiece) may be generated by utilizing distances 14-18 and 18-22 that are unequal. Specifically, if a variation from straight line motion is desired, it can, within limits, be accomplished by variations in the distances 14-18 and 18-22 accompanied by appropriate sizing of pulleys 98 and 36. The isosceles relationship in which 14-18 substantially equals 18-22 is ordinarily preferable because it gives the maximum straight line stroke (i.e. four times the distance 14-18 or 18-22) and involves simpler relationships of lengths and pulley diameters.

Orientation of the work attachment 106 about the axis 22 is controlled by the second coordinating means 26. With the 1:2 ratio between pulleys 108 and 102 that has been described, rotation of the work attachment 106 will be equal to angular movement by crank arm 202 (or 12) about the axis 14 so that it remains straight even though it is moved horizontally. Alternatively, different orientations can be automatically achieved by varying the pulley ratios; or, even further, the second coordinating means 26 can be eliminated and the work attachment 106 simply allowed to rotate freely and manually on bearing 104, or not at all by eliminating the bearing. Finally, it is contemplated that application of the present invention would permit continuous 360° rotation of the crank arm 202 about first axis 14.

While toothed pulleys and timing belts are presently preferred for the geared connections 24, 26 and 220, other suitable forms of geared connection (e.g. using chains, V belts, wire ropes or gear trains) could be used. Similarly, instead of electric motors, hydraulic or fluid motors may be used depending upon the application, etc.

For use as production equipment, operation of the two motors can be controlled and coordinated by any suitable control system and may be programmed by use of a computerized numerical control system to secure a desired sequence or combination of horizontal and vertical movements and a desired automatically repeatable path of movement of the work-holding attachment 106. Work-holding attachments such as jaws as shown in U.S. Pat. No. 3,975,992, for example, or controllable magnets or vacuum cups, etc., can therefore be secured to the attachment holding means 106 and operated in harmony with the apparatus 1 to pick-up, move, load and/or unload, and release workpieces (not shown) with respect to industrial presses, conveyors, etc.

Thus, the invention provides a heavy duty workpiece handling device which by virtue of the large turntable bearings and other features described above eliminates the need for a guide track (such as used in British Patent No. 1,395,085) and uses articulated and controlled cantilever action to impart a desired motion to a workpiece. Further, the geared interconnection and sizing of the pivotable arms generate a line-of-work that is substantially linear long a common vertical mid-plane.

Modifications in the specific structure shown can be made without departing from the spirit and scope of the invention.

I claim:

1. Heavy duty workpiece handling apparatus for loading and unloading an industrial press or the like comprising a carrier adapted to be mounted on a support surface for said apparatus, a tubular carriage having a longitudinal axis, carriage support means supporting said carriage on said carrier so that said longitudinal axis is vertical and so that said carriage is linearly reciprocable along said vertical longitudinal axis but is constrained against angular movement around said longitudinal axis and so that substantially all load on said carriage is transmitted into said carrier, power operated means for linearly reciprocating said carriage along said vertical longitudinal axis, said axis defining a first pivot axis, a first horizontally extending cantilever arm, first means pivotally supporting said first arm on said carriage to pivot in a horizontal plane about said first axis and to transfer substantially all load on said first arm into said carriage, a second horizontally extending cantilever arm, second means pivotally supporting said second arm on an end of said first arm to pivot in a horizontal plane about a second vertical pivot axis and to transfer substantially all load on said second arm into said first arm, work-supporting means adjacent an end of said second arm, third means pivotally supporting said work-supporting means on said end of said second arm to pivot in a horizontal plane about a third vertical pivot axis and to transfer substantially all load on it into said second arm, said first and third pivot axes being located predetermined fixed distances from said second axis, movement coordinating means supported on and movable with said first and second arms and arranged to so coordinate movement about said pivot axes that said work-supporting means moves in a predetermined horizontal path and with a predetermined angular orientation about said third axis, said coordinating means comprising belt means extending along said first and second arms and pulleys for said belt means disposed about each of said three axes, power operated arm actuating means affixed to said non-pivotal tubular carriage for generating horizontal movement of said arms, and drive means for coupling said power operated arm actuating means to said first arm to pivot said first arm around said first axis, whereby movement of said first arm causes said movement coordinating means to pivot said first and second arms relative to each other whereby said work-supporting means moves along said horizontal path with said predetermined angular orientation.

2. An apparatus as set forth in claim 1 wherein said carriage support means includes cylinder means.

3. An apparatus as set forth in claim 2 wherein said carriage support means act to suspend said tubular carriage and said cylinder means act between said carrier and carriage to take the weight of said carriage and the load on said carriage.

4. An apparatus as set forth in claim 1 wherein said carriage support means includes roller means between said carrier and tubular carriage to guide its movement along said first axis and to provide means to fix the angular position of said carriage and said drive means relative to said carrier, said roller means being arranged in axially separated opposed sets of rollers on opposite sides of said first axis.

5. An apparatus as set forth in claim 1 wherein said power operated arm actuating means includes a motor rigidly secured to said carriage for reciprocable movement therewith, said motor acting to drive a geared connection coupled to said first arm, said geared connection including a first pulley secured to said first arm in coaxial surrounding relation to said carrier along said first pivot axis, a second pulley coupled directly to said motor so as to be rotatably driven upon energization thereof, and belt means for interconnecting said first and second pulleys.

6. Heavy duty workpiece handling apparatus for loading and/or unloading a press or the like comprising mounting means for overhead mounting of the apparatus and having a substantially vertical axis comprising a first pivot axis, said mounting means including a non-pivotal tubular carriage and a large diameter annular turntable bearing means having inner and outer races and the inner one of said races being secured to the bottom end of said tubular carriage, said tubular carriage and turntable bearing means being coaxial with said vertical first pivot axis, said turntable bearing means receiving substantially the entire load handled by said apparatus, a first cantilever arm secured to said outer race in a horizontal plane below the carriage and mounting means whereby it is pivotally mounted on said tubular carriage for angular movement in a horizontal plane below said carriage and mounting means about said first pivot axis, a second cantilever arm pivotally mounted on the bottom of said first arm for angular movement about a second pivot axis substantially parallel to said first pivot axis in a second horizontal plane below said first arm, and work-supporting means adjacent the end of said second arm and aligned with a third axis substantially parallel to said first and second pivot axes, said first and third axes being substantially equidistant from said second axis, said apparatus including coordinating means comprising structure supported on and movable with at least one of said arms and arranged to so coordinate movements of said first and second arms about said first and second axes respectively, such that said work-supporting means moves in a predetermined horizontal path below the level of said second horizontal plane and perpendicular to said axes, and power operated arm actuating means affixed to said carriage and coupled to said first arm so as to pivot said first arm about said first axis such that rotation of said first arm causes said coordinating means to rotate said second arm relative to said first arm about said second pivot axis and to pivot said first arm on said turntable bearing means whereby said work-supporting means moves along said predetermined path, said mounting means including a carrier and carriage support means supporting said carriage on said carrier so that the longitudinal axis of said carriage is vertical, said carriage being linearly reciprocable along said first vertical axis but constrained against angular movement around said first axis with substantially all load on said carriage being transmitted into said carrier, and power operated means for linearly reciprocating said carriage, power operated arm actuating means, first arm and second arm along said vertical longitudinal axis.

7. Heavy duty workpiece handling apparatus for loading and/or unloading a press or the like comprising a carrier adapted to be mounted on an overhead support surface for the apparatus, a vertically extending non-pivotal tubular carriage having a longitudinal axis and a relatively large diameter first turntable bearing means having inner and outer annular races with said inner race being secured to the bottom end of said tubular carriage, said tubular carriage and said turntable bearing means being coaxial and said axis being vertical and defining a first pivot axis, carriage support means supporting said carriage on said carrier so that said longitudinal axis is vertical and so that said carriage is linearly reciprocable along said vertical longitudinal axis but is constrained against angular movement around said first pivot axis with substantially all load on said carriage being transmitted into said carrier, power operated means for linearly reciprocating said carriage along said vertical longitudinal axis, a first horizontally extending cantilever arm secured at its first end to said outer race at a level below said carriage and carrier whereby it is supported and pivotally mounted on said carriage for pivotal movement in a first horizontal plane about said first pivot axis, a second horizontally extending cantilever arm located in a second horizontal plane beneath said first arm, second cantilever arm support means supporting a first end of said second arm on a second end of said first arm and beneath said first arm for pivotal movement in said second horizontal plane about a second vertical axis substantially parallel to said first vertical axis and for transmitting load on said second arm into said first arm, a work-supporting member having support means for supporting said work-supporting member on a second end of said second arm for pivotal movement about a third vertical axis substantially parallel to said first and second pivotal axes and for transmitting load on said work-supporting member into said second arm, said first and third pivot axes being located predetermined fixed distances from said second pivot axis, said apparatus including first coordinating means arranged to so coordinate movements of said first and second arms about said first and second vertical pivot axes, respectively, such that said work-supporting member moves in a substantially linear path below said second horizontal plane, second coordinating means comprising a geared connection from said first arm to said work-supporting member whereby the pivotal orientation of said work-supporting member about said third axis is maintained throughout said linear path, and power operated arm actuating means affixed to said carriage and coupled to said first arm for pivoting said first arm such that said first and second coordination means pivot said arms around said first and second vertical axes, substantially all the load on said work-supporting member being transmitted by said support means into said second arm and substantially all load on said second arm being transmitted by said second cantilever arm support means into said first arm, and substantially all the load on said first arm being transmitted by it into said first turntable bearing means and by said means into said vertically extending tubular carriage.

8. An apparatus according to claim 7 wherein said second cantilever arm support means comprises a relatively large diameter second turntable bearing means having first and second annular races substantially coaxial with said second axis, said first race of said second turntable bearing means being secured to said second end of said first arm and the second race thereof being secured to said first end of said second cantilever arm.

9. An apparatus according to claim 8 wherein said support means for said work-supporting means comprises a third turntable bearing means having first and second annular races substantially coaxial with and defining said third pivot axis, said first race of said third turntable bearing means being secured to said second end of said second arm and said second race being secured to said work-supporting member.

10. An apparatus according to claim 7 wherein said power operated arm actuating means is non-pivotally affixed to said carriage, drive means coupling said power operated arm actuating means to said first arm to rotate said first arm about said first pivot axis whereby said first and second coordinating means cause rotation of said first and second arm relative to each other to generate substantially linear movement of said work-supporting member.

11. Heavy duty workpiece handling apparatus for loading and/or unloading a press or the like comprising mounting means for supporting the apparatus on a support surface, said mounting means including a vertically extending non-pivotal tubular carriage and a relatively large diameter first bearing means having first and second annular races and said first race being secured to said tubular carriage, said tubular carriage and said turntable bearing means being coaxial and said axis being vertical and defining a first pivot axis, a first horizontally extending cantilever arm secured at one end to said second race whereby it is supported and pivotally mounted on said mounting means for pivotal movement in a first horizontal plane about said first pivot axis, a second horizontally extending cantilever arm located in a second horizontal plane beneath said first arm, second bearing means supporting one end of said second arm on the other end of said first arm and beneath said first arm for pivotal movement in said second horizontal plane about a second vertical axis substantially parallel to said first vertical axis and for transmitting load on said second arm into said first arm, work-supporting means, third bearing means supporting said work-supporting means on the other end of said second arm for pivotal movement about a third vertical axis substantially parallel to said first and second pivotal axes and for transmitting load on said work-supporting means into said second arm, said first and third pivot axes being located substantially equal distances from said second pivot axis and defining a common vertical mid-plane, said apparatus including first coordinating means arranged to so coordinate movements of said first and second arms about said first and second vertical axes that said work-supporting means moves in a substantially straight and horizontal path below the level of said first arm along said common vertical mid-plane, and second coordinating means comprising a geared connection from said first arm to said work-supporting means whereby the pivotal orientation of said work-supporting means about said third axis is predetermined throughout said path, said apparatus comprising first power operated means affixed to said carriage and including drive means for coupling said first power operated means to said first arm so as to controllably drive said first and second coordinating means, respectively, with substantially all the load on said work-supporting means being transmitted by said third bearing means into said second arm and substantially all load on said second arm being transmitted by said second bearing means into said first arm, and substantially all the load on said first arm being transmitted by it into said first bearing means and by said first bearing means into said vertically extending tubular carriage, said mounting means including a carrier, said tubular carriage being supported by and vertically reciprocable relative to said carrier in a direction along said first vertical axis, said first bearing means pivotally mounting and supporting said first arm on said carriage for vertical movement with said carriage, and second power operated means for vertically moving said tubular carriage along said first vertical axis, said carriage being suspended from said carrier by means comprising at least one fluid damper located about the level of said first bearing means.

12. An apparatus according to claim 11 wherein said second power operated means comprises a nut-and-screw arrangement which determines the vertical position of said tubular carriage relative to said carrier, one of said nut and said screw being non-rotatably secured to one of said carriage and said carrier and the other of said nut and said screw being arranged to be rotated by a motor mounted on the other of said carriage and said carrier.

13. An apparatus according to claim 11 wherein said carriage is telescopically arranged within said carrier, said carriage and carrier having facing flat sides and including rollers mounted on one of said carriage and said carrier and arranged to roll against the flat faces of said carriage and serving to guide telescopic movement of said carriage.

14. An apparatus according to claim 13 in which said first and third vertical axes are located substantially equi-distant from said second pivot axis within said common vertical mid-plane, and said first coordination means comprises a first geared connection in the ratio of substantially 2:1 from said tubular carriage to said second arm and said second coordinating means comprises a second geared connection in the ratio of substantially 1:2 from said first arm to said work-supporting means.

15. An apparatus according to claim 14 in which said first and second arms are hollow and said first geared connection extends through said first arm to said second arm, and said second geared connection extends through said second arm to said work-supporting means, said first and second geared connections comprise timing belts extending through said arms and pulleys disposed about each of said three axes, said timing belts extending around said pulleys, the pulley around the first axis being secured at and around the lower end portion of said tubular carriage.

16. Heavy duty workpiece handling apparatus for loading and/or unloading a press or the like comprising a carrier adapted to be mounted on an overhead support surface for the apparatus, a vertically downwardly extending non-pivotal tubular carriage having a longitudinal axis, a relatively large diameter turntable bearing means having inner and outer annular races with said inner race being secured to said tubular carriage at the bottom end of said carriage, said tubular carriage and said turntable bearing means being coaxial and said axis being vertical and defining a first axis, carriage support means supporting said carriage on said carrier so that longitudinal axis is vertical and so that said carriage is linearly reciprocable along said vertical longitudinal axis but is constrained against angular movement around said axis and so that substantially all load on said carriage is transmitted into said carrier, power operated means for linearly reciprocating said carriage along said vertical longitudinal axis, a first horizontally extending cantilever arm secured at one end to said outer race whereby it is supported and pivotally mounted on said carriage for pivotal movement in a horizontal plane below said carriage about said first vertical axis, a second horizontally extending cantilever arm located on a horizontal level beneath said first arm, second cantilever arm support means supporting one end of said second arm on the other end of said first arm and beneath said first arm for pivotal movement in a horizontal plane about a second vertical axis substantially parallel to said first vertical axis and for transmitting load on said second arm into said first arm, work-supporting means having support means for supporting said work-supporting means on the other end of said second arm for transmitting load on said work-supporting means into said second arm, said apparatus including arm movement coordinating means arranged to so coordinate movements of said first and second arms about said first and second vertical pivot axes such that said work-supporting means moves in a predetermined path below the level of said second arm, and power operated arm actuating means affixed to said carriage and coupled to said first arm for rotating said first arm about said first vertical axes and causing said movement coordinating means to move said work-supporting means in said predetermined path.

17. Heavy duty workpiece handling apparatus as in claim 16 further comprising second movement coordinating means including a geared connection between said first arm and said work-supporting means whereby the pivotal orientation of said work-supporting means about a third vertical axis relative to said carriage is selectively maintained along a substantial linear horizontal path.

18. Heavy duty workpiece handling apparatus as in claim 16 further comprising a geared connection between said power operated arm actuating means and said first arm, said geared connection comprising a pulley secured fast to said first arm in coaxial surrounding relation to said carriage, a second pulley driven by said arm actuating means, and belt means between said first and second pulleys such that energization of said arm actuation means causes said first arm to pivotally move about said first axis.

19. Heavy duty workpiece handling apparatus for loading and/or unloading a press or the like comprising a carrier adapted to be mounted on an overhead support surface for the apparatus, a vertically downwardly extending non-pivotal tubular carriage having a longitudinal axis, a relatively large diameter first turntable bearing means having inner and outer annular races with said inner races being secured to said tubular carriage at the bottom end of said carriage, said tubular carriage and said first turntable bearing means being coaxial and said longitudinal axis being vertical and defining a first pivot axis, carriage support means supporting said carriage on said carrier so that said longitudinal axis is vertical such that said carriage is linearly reciprocable along said vertical longitudinal axis but is constrained against angular movement around said first axis and so that substantially all load on said carriage is transmitted into said carrier, first power operated means for linearly reciprocating said carriage along said vertical longitudinal axis, a first horizontally extending cantilever arm secured at a first end to said outer race whereby said first arm is supported and pivotally mounted on said carriage for pivotal movement in a first horizontal plane below said carrier and said carriage about said first vertical axis, a second horizontally extending cantilever arm located in a second horizontal plane beneath said first horizontal plane, second cantilever arm support means supporting a first end of said second arm on a second end of said first arm and beneath said first arm for pivotal movement in said second horizontal plane about a second vertical axis substantially parallel to said first vertical axis and for transmitting load on said second arm into said first arm, work-supporting means having support means for supporting said work-supporting means on the other end of said second arm for transmitting load on said work-supporting means into said second arm, said apparatus including movement coordinating means arranged to so coordinate movements of said first and second arms about said first and second vertical pivot axes that said work-supporting means moves in a predetermined path below the level of said first arm, second power operated means for pivoting said first and second arms about said first and second vertical axes in their respective horizontal planes, said second power operated means affixed to said carriage and coupled to said first arm for driving said movement coordinating means, substantially all the load on said work-supporting means being transmitted by said support means into said second arm and substantially all load on said second arm being transmitted by said second cantilever arm support means into said first arm, and substantially all the load on said first arm being transmitted by it into said first turntable means and by said first turntable means into said vertically extending tubular carriage, said carriage being telescopically mounted inside said carrier, said carriage and carrier having facing flat side faces, and sets of rollers between the carriage and carrier and engaging said flat faces and serving to guide telescopic movement of the carriage along said first vertical axis, and at least one fluid damper located above said first turntable bearing means and connected to said carriage and to said carrier and suspending said carriage on said carrier for transferring the weight of said carriage and its load into said carrier, said sets of rollers and fluid damper comprising said carriage support means.

* * * * *